UNITED STATES PATENT OFFICE.

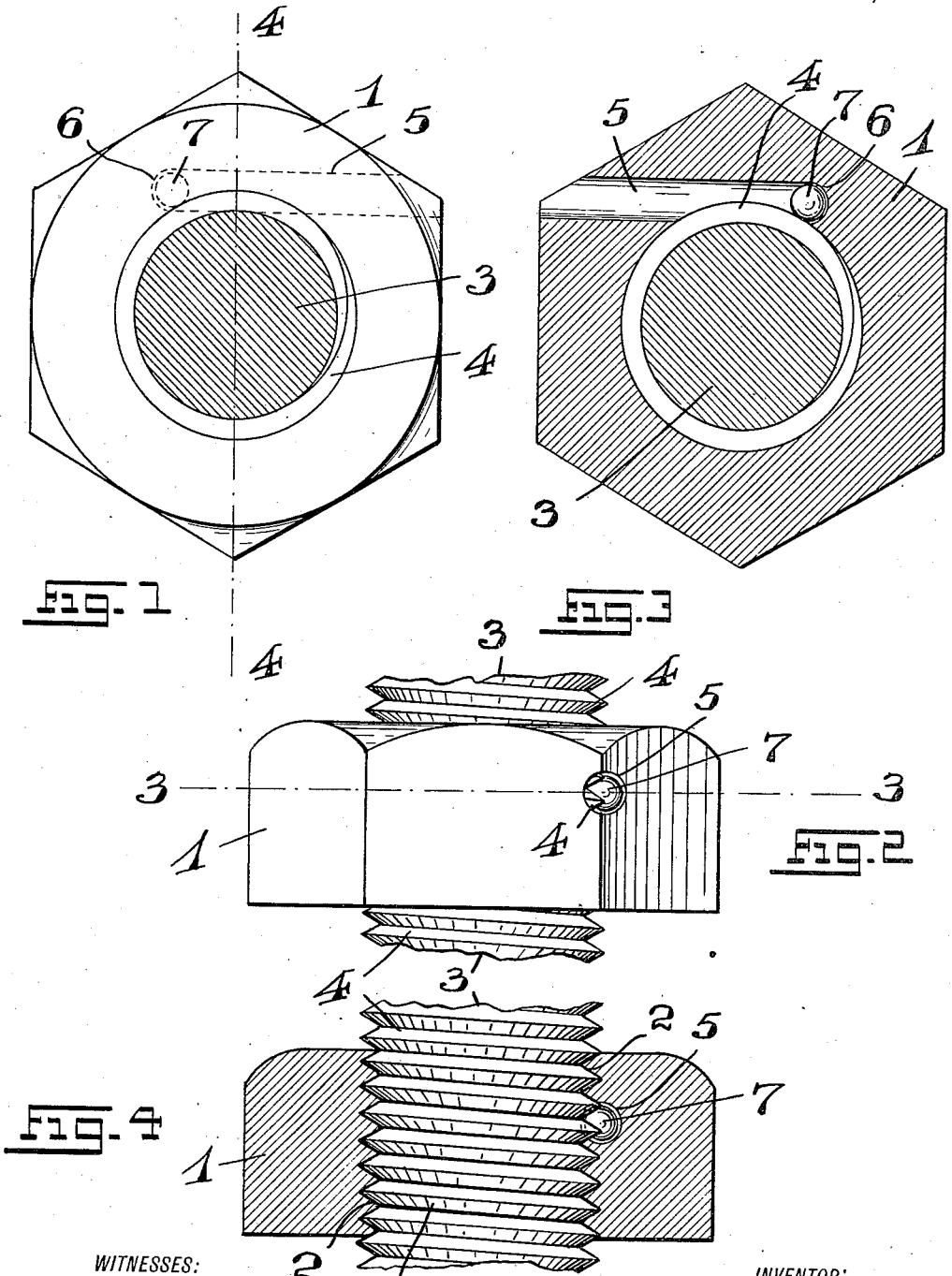

LEWIS E. SCHLOTTERBACK, OF EAST ORANGE, NEW JERSEY, ASSIGNOR TO L. E. SCHLOTTERBACK MANUFACTURING CO., A CORPORATION OF NEW JERSEY.

NUT-LOCK.

1,043,258.  Specification of Letters Patent.  Patented Nov. 5, 1912.

Application filed August 4, 1911.  Serial No. 642,221.

*To all whom it may concern:*

Be it known that I, LEWIS E. SCHLOTTERBACK, citizen of the United States, residing at East Orange, in the county of Essex and State of New Jersey, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in lock-nuts; and, the invention relates, more particularly, to a lock-nut the locking element of which is contained within the body of a nut of any desired form or type.

The present invention has for its principal object to provide a very simple, cheap and effective construction of lock-nut, the same having the appearance of the ordinary nuts commonly in use, and the locking element of the nut being arranged so that the nut may be easily turned in one direction, to screw the same home, but which will resist the turning or moving of the nut in an opposite direction, so as to prevent the nut being jarred or turned loose. The novel locking element is arranged in such a manner, so that the same cannot injure the thread of the bolt, and is of such construction so that the same may be easily released from its locking engagement with the bolt, to enable the nut to be quickly and easily unscrewed, and that the nut and its locking element may be used over and over again.

Other objects of the present invention not at this time more particularly enumerated will be clearly understood from the following detailed description of the same.

With the objects of the present invention in view, the invention consists, primarily, in the novel construction of lock-nut hereinafter set forth; and, furthermore, this invention consists in the novel arrangements and combinations of the several parts of the device, as well as in the details of the construction of the same, all of which will be more fully described in the following specification, and then finally embodied in the clauses of the claim which are appended to and which form an essential part of the said specification.

The invention is clearly illustrated in the accompanying drawings, in which:—

Figure 1 is a plan or top-face view of a lock-nut made according to and embodying the principles of the present invention, the same being shown in its normal relation with a bolt-shank, which is represented in cross-section. Fig. 2 is a side elevation of the same; Fig. 3 is a horizontal section of the same, taken on line 3—3 in said Fig. 2; and Fig. 4 is a transverse vertical section of the same, taken on line 4—4 in said Fig. 1.

Similar characters of reference are employed in all of the hereinabove described views, to indicate corresponding parts.

Referring now to the said drawings, the reference-character 1 indicates a suitable nut which is provided with the usual internal screw-threads 2, and the reference-character 3 indicates a portion of the screw-threaded shank of a bolt or the like which is formed with the usual external screw-threads 4 adapted to be received by said internal screw-threads 2 of said nut-body 1. The body of the said nut is provided with an inwardly extending and preferably cylindrically formed opening or chamber, as 5, said chamber extending laterally across a portion of the nut and at an angle to the longitudinal axis of the screw-threaded shank of the bolt, or the like, said chamber extending across a portion of the internal screw-thread 2 of the nut, thereby providing a suitable opening into which a portion of the external screw-threads 4 of the bolt, or the like, penetrate so as to project into said chamber 5. The bottom or end 6 of said opening or chamber 5 extends slightly beyond the place of penetration of said external screw-threads 4, thereby forming a pocket in which is arranged a locking or retaining means, such as a steel ball 7, supported in such a manner so as to be brought into engagement with a portion of the external screw-threads 4 of the bolt or the like. When the said nut, with the lock-ball 7 is thus arranged, the nut may be readily turned upon said bolt-body 3, the action of the moving bolt-thread 4, as it passes through said opening or chamber 5, tending to roll the lock-ball 7 toward the bottom or end 6, and, which being rounded, permits the ball to turn freely without any friction or binding action upon the screw-threads 4. When, however, the nut is turned in the opposite direction, that is in a manner to unscrew the same from said screw-threaded shank, then the action of the moving bolt-thread 4, as it passes through said opening or chamber 5, tends to roll said ball 7 away from the bottom or end 6 and forces or wedges the same between the external thread 4 and the upper inner wall-portion of said opening or chamber 5, whereby the ball 7 exercises considerable friction or a binding action upon and between said nut-body and said bolt-thread, and the harder the force exerted to turn the nut, the tighter will said lock-ball bind. Of course, it will be clearly understood, that the allowance of space for the movement of said lock-ball 7 need be very slight, a few thousandths of an inch sufficing. When it is desired to remove the nut from the bolt body, the said lock-ball 7 may be prevented from exercising its locking or wedging function by simply inserting a small rod, such as a wire-nail or other small body, within said opening or chamber 5, thereby holding back said lock-ball 7 against the bottom 6 of the said opening or chamber, whereupon the action of the external screw-threads of said bolt-body upon the lock-ball is prevented, so that the nut may be quickly and easily unscrewed from the screw-threaded shank of the bolt, or the like.

It will, therefore, be clearly evident, that the present invention provides an exceedingly efficient lock-nut, of a very simple and lasting character, which is easily manipulated, and is capable of use over and over again. Furthermore, the exterior of the nut-body being unchanged, and it being possible to use any design or shape of nut, it will be clearly understood that the present lock-nut can be used wherever it is possible to use an ordinary nut.

I am aware that some changes may be made in the general arrangements and combinations of the parts comprising the nut-lock embodying the principles of the present invention, as well as in the details of the construction of the same, without departing from the scope of the present invention, as set forth in the foregoing specification, and as defined in the clauses of the claim which are appended thereto. Hence, I do not limit my invention to the exact arrangements and combinations of the various parts as described in said specification, nor do I confine myself to the exact details of the construction of the said parts, as illustrated in the accompanying drawings.

I claim:—

A lock-nut comprising a nut-body provided with a transverse and inwardly extending opening or chamber provided with a rounded concave wall, the inner wall of said chamber extending across the screw-threads of said nut-body, so as to form an opening which the threads of a bolt may penetrate, the rounded concave end-wall of said opening or chamber lying slightly beyond the said opening and forming a pocket tangent to the top of said bolt-threads, and a lock-ball arranged in said pocket and adapted to be brought into holding engagement with the penetrating screw-threads of a bolt, substantially as and for the purposes set forth.

In testimony, that I claim the invention set forth above I have hereunto set my hand this 27th day of July, 1911.

LEWIS E. SCHLOTTERBACK.

Witnesses:
GEORGE D. RICHARDS,
HERMAN J. KOEBLER.

Copies of this patent may be obtained for five cents each, by addressing the "Commissioner of Patents, Washington, D. C."